United States Patent
Periot

(10) Patent No.: US 10,071,750 B2
(45) Date of Patent: Sep. 11, 2018

(54) PROTECTION SYSTEM OF A RAILWAY VEHICLE TRACTION SYSTEM, ASSOCIATED TRANSMISSION LINE AND ASSOCIATED RAILWAY VEHICLE

(71) Applicant: ALSTOM TRANSPORT TECHNOLOGIES, Saint-Ouen (FR)

(72) Inventor: Robert Periot, Lamayou (FR)

(73) Assignee: Alstom Transport Technologies, Saint-Ouen (FR)

( * ) Notice: Subject to any disclaimer, the term of this patent is extended or adjusted under 35 U.S.C. 154(b) by 241 days.

(21) Appl. No.: 15/018,200

(22) Filed: Feb. 8, 2016

(65) Prior Publication Data
US 2016/0229421 A1 Aug. 11, 2016

(30) Foreign Application Priority Data
Feb. 6, 2015 (FR) ...................................... 15 50929

(51) Int. Cl.
| | |
|---|---|
| B61C 15/14 | (2006.01) |
| B60L 3/00 | (2006.01) |
| F16D 9/00 | (2006.01) |
| B61C 3/00 | (2006.01) |
| B61L 3/14 | (2006.01) |

(52) U.S. Cl.
CPC .............. B61C 15/14 (2013.01); B60L 3/00 (2013.01); B60L 3/003 (2013.01); B60L 3/0061 (2013.01); B61C 3/00 (2013.01); B61L 3/14 (2013.01); F16D 9/00 (2013.01); B60L 2200/26 (2013.01)

(58) Field of Classification Search
CPC ...... B60L 3/00; B60L 9/00; B60L 9/08; B60L 9/10; B60L 9/12; B60L 9/24; B60L 9/30; B60L 9/32
See application file for complete search history.

(56) References Cited

U.S. PATENT DOCUMENTS

| | | | |
|---|---|---|---|
| 3,265,408 A | 8/1966 | Dickie | |
| 3,847,085 A * | 11/1974 | Rypinski | B61B 15/00 104/122 |
| 3,977,213 A | 8/1976 | Spencer et al. | |

FOREIGN PATENT DOCUMENTS

| | | |
|---|---|---|
| DE | 1231494 B | 12/1966 |
| DE | 2508812 A1 | 9/1976 |
| DE | 19719746 C1 | 8/1998 |
| EP | 0869290 A1 | 10/1998 |

OTHER PUBLICATIONS

Search Report dated Dec. 4, 2015 in corresponding FR application No. 1550929.

* cited by examiner

*Primary Examiner* — Robert J McCarry, Jr.
(74) *Attorney, Agent, or Firm* — Knobbe, Martens, Olson & Bear, LLP

(57) ABSTRACT

A protection system of a railway vehicle traction system includes an electric motor and an electrical power supply circuit. The system further includes: a mechanical coupler between first and second components of a transmission line, the first component being connected to an output shaft of the electric motor and the second component being connected to an input shaft of an axle of the railway vehicle, the coupler being able to be in an engaged or disengaged state; and a controller able to apply a disengagement signal to the coupling signal, to switch from the engaged state to the disengaged state if a failure of the power supply circuit and/or the electric motor is detected.

9 Claims, 3 Drawing Sheets

PROTECTION SYSTEM OF A RAILWAY VEHICLE TRACTION SYSTEM, ASSOCIATED TRANSMISSION LINE AND ASSOCIATED RAILWAY VEHICLE

CROSS-REFERENCE TO RELATED APPLICATION

This application claims priority to French Patent Application No. 15 50929 filed on Feb. 6, 2015, the disclosure of which including the specification, the drawings, and the claims is hereby incorporated by reference in its entirety.

FIELD OF THE INVENTION

The present invention relates to a protection system of a railway vehicle traction system, said traction system including an electric motor and an electrical power supply circuit of the electric motor.

The invention more particularly relates to a protection system for a permanent magnet synchronous electric motor for a railway vehicle.

BACKGROUND OF THE INVENTION

To power such a motor, a power chain successively includes a converter, an insulating contactor, cables connected between the insulating contactor and the input terminals of the motor.

If an electric fault is detected of the short-circuit type, the insulating contactor is opened to insulate the converter from the electric motor. As a result, the components of the converter are protected against the electrical power generated by the electric motor operating at that time as a current source, since it is driven by the wheels of the moving railway vehicle.

However, opening the insulating contactor does not make it possible to insulate an electric fault downstream from the insulating contactor, i.e., an internal fault of the electric motor or an external fault of the electric motor, for example between the connecting cables.

Yet such a fault downstream from the insulating converter is generally associated with the formation of an electric arc, which can lead to the outbreak of a fire or the destruction of the electric motor. In the latter case, there is a risk of the rotor being blocked inside the stator of the motor, leading to a feared event requiring immobilization of the train and evacuation of the passengers.

To guarantee the operating protection of such a permanent magnet synchronous electric motor, it is necessary to manage any possible failure to avoid any feared event.

Document EP 2,634,884 thus provides for equipping the power chain with additional controlled switches making it possible to dead short-circuit phases of the motor, to avoid the formation and spread of an electric arc. However, such a device does not make it possible to resolve all types of faults internal to the machine.

SUMMARY OF THE INVENTION

The invention therefore aims to resolve the aforementioned problem by deploying an alternative protection solution to the solution of the state of the art.

To that end, the invention relates to a protection system for a railway vehicle traction system, characterized in that it comprises:

a mechanical coupler between first and second components of a transmission line, the first component being connected to an output shaft of the electric motor and the second component being connected to an input shaft of an axle of the railway vehicle, the coupler being able to be in an engaged state, in which a torque can be transmitted between the first and second components, or in a disengaged state, in which no torque can be transmitted between the first and second components; and controller able to apply a disengagement signal to the mechanical coupler, so as to switch the mechanical coupler from the engaged state to the disengaged state if a failure is detected affecting the power circuit of the electric motor and/or the electric motor itself.

The invention makes it possible, through the implementation of a robust mechanical solution, to mechanically insulate the electric motor from the axle, so as to guarantee protection of the power chain and the electric motor if a failure is detected, irrespective of the nature of that failure. Any feared event can thus be avoided.

A protection system according to the invention can further include one or more of the following features, considered alone or according to any technically possible combination:

the coupler includes at least one element securing the first and second components to one another and a pyrotechnic module able to break the securing element when a disengagement signal is applied by the controller;

the first and second components are first and second flanges across from one another, and in which the mechanical coupler is an explosive bolt securing the first and second flanges to one another;

the controller includes a remote control module, connected by a wireless link to a close control module, secured to the coupler, the close control module generating the disengagement signal applied to the coupler upon reception of an actuating signal emitted by the remote control module;

the controller includes a detector able, if a failure is detected, to send an alert signal to the remote control module so that the remote control module commits an actuating signal;

the detector is able to calculate estimated output values from measured input values and a dynamic model of the traction system, and to compare these estimated output values to measured output values of the traction system, the detection module being able to emit an alert signal in case of significant deviation between the estimated and measured output values;

the coupler is able to switch irreversibly from the engaged state to the disengaged state;

the mechanical coupler is able to switch from the engaged state to the disengaged state upon receiving a disengagement signal, and vice versa, to switch from the disengaged state to the engaged state upon receiving an engagement signal.

The invention also relates to a transmission line between an electric motor and a railway vehicle axle, characterized in that it comprises a protection system as previously defined.

This transmission line has a separator, which separates the electric motor from the axle of the railway vehicle, insulating the motor from any mechanical driving when the protection system is activated.

A transmission line according to the invention can further include the mechanical coupler installed between first and second components of the transmission line, the first and second components being first and second flanges provided on the facing ends of two half-shafts of the transmission line between the electric motor and the axle, or between a first stage and a second stage of a reduction gear of the transmission line.

The invention also relates to a railway vehicle, characterized in that it comprises a transmission line as defined above.

BRIEF DESCRIPTION OF THE DRAWINGS

The invention will be better understood upon reading the following description, provided solely as an example and done in reference to the appended figures, in which.

DETAILED DESCRIPTION OF THE PREFERRED EMBODIMENTS

Below, the term "electromotive force" is to be understood as the capacity of an electric motor to generate electrical power, in particular during downgraded operation.

Figure 1:
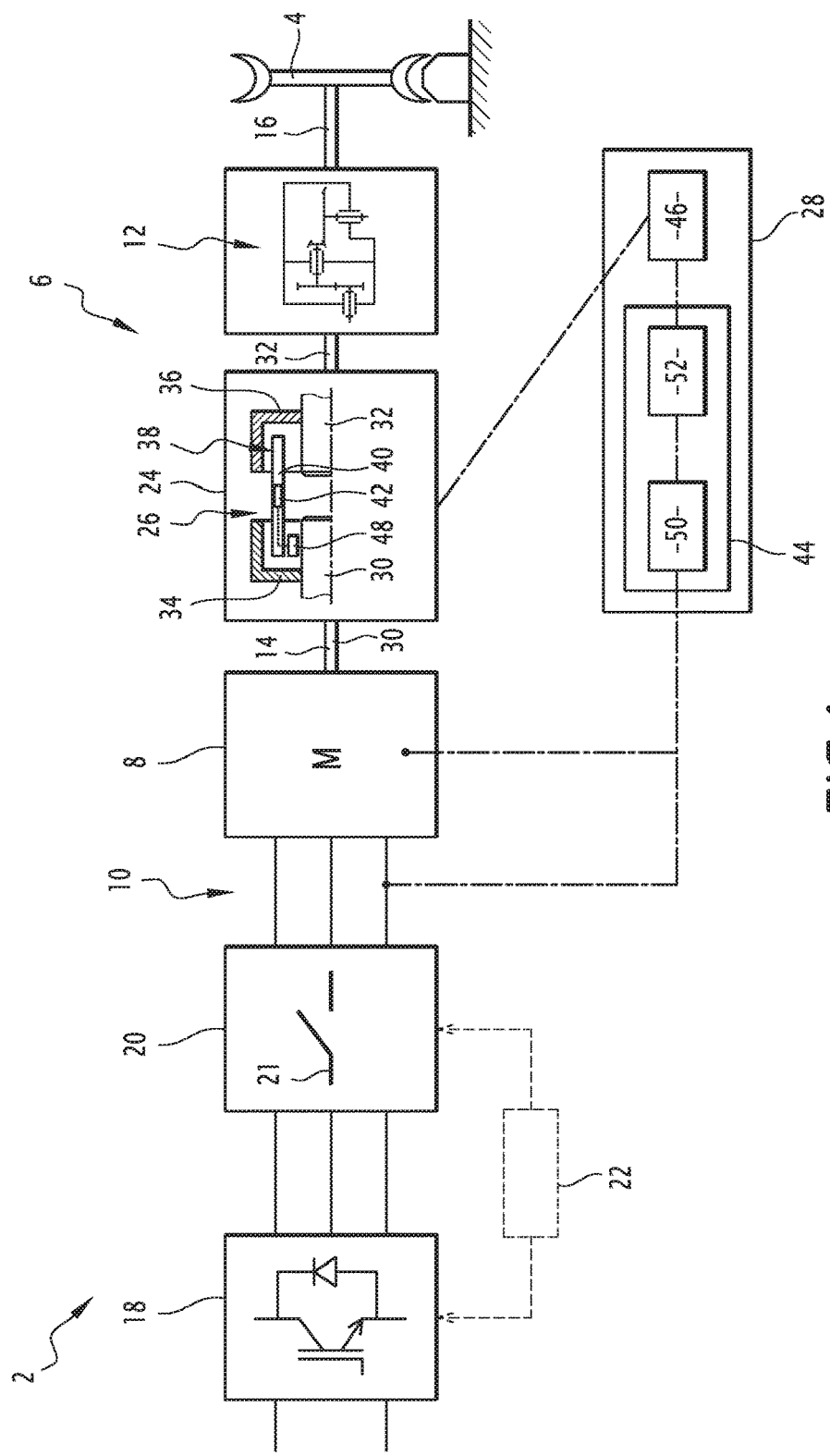
FIG. 1 is a diagram illustrating a railway vehicle traction system including a protection system according to a first embodiment.

FIG. 1 shows a first embodiment of a traction system 2.

The system includes an axle 4, a transmission line 6, a permanent magnet motor 8 and an electric power circuit 10 of the motor.

The motor 8 is a permanent magnet synchronous motor.

The axle 4 is an assembly made up of a pin secured to at least one pair of wheels, which are guided on a pair of rails.

The transmission line 6 comprises a reduction gear 12, with one or more stages, positioned between an output shaft 14 of the motor 8 and an input shaft 16 of the axle 4.

The electric power circuit 10 includes an inverter 18, an insulating contactor 20, a switch 21 for dead short-circuiting of the phases of the motor, and a controller 22 controlling the contactor 20 and the switch 21.

The inverter 18 includes three output terminals. Each terminal is connected to a phase of the electric motor 8 through the insulating contactor 20, the switch 21, by a connecting cable.

The controller 22 is able to detect a failure, in particular of the short-circuit type, of the power circuit 10 and to command opening of the contactor 20.

Opening the contactor 20 makes it possible to insulate the inverter 18 from the electric motor 8, which, if a fault occurs, continues to be rotated by the axle 4 and generates an electromotive force that could destroy the inverter 18.

However, opening the contactor 20 is not sufficient, since, in particular in case of short-circuit internal to the motor 8, the electromotive force generated by the motor 8, coupled with the axle 4, risks destroying the motor 8 itself.

The traction system 2 thus includes a protection system 24.

The protection system 24 makes it possible to mechanically insulate the electric motor 8 from the axle 4, in particular until the railway vehicle is stopped. In this way, the rotor no longer being rotated by the axle 4, the motor 8 ceases to generate an electromotive force.

The protection system 24 comprises a coupler 26 and controller 28 of the coupler 26.

The coupler 26 is placed between a first component 30 and a second component 32 of the transmission line 6.

The coupler 26 is able to switch, irreversibly, from an engaged state to a disengaged state, upon receiving an appropriate disengagement signal, generated by the controller 28.

In the engaged state, torque can be transmitted between the first and second components 30, 32 of the transmission line 6.

In the disengaged state, no torque can be transmitted between the first and second components 30, 32 of the transmission line.

In the first embodiment of FIG. 1, the first component 30 is an output shaft 14 of the electric motor 8 and the second component 32 is an input shaft of the reduction gear 12.

More specifically, the free end of the output shaft 14 of the motor ends with a first flange 34, which is positioned opposite a second flange 36 provided on the end of the input shaft of the reduction gear 12.

The coupler 26 is made up of a plurality of explosive bolts or pins for securing the first and second flanges 34, 36 to one another.

An explosive bolt 38 includes a shank 40 able to secure the first and second flanges 34, 36 to one another and a pyrotechnic module 42 able to break the shank 40, upon receiving the appropriate disengagement signal from the controller 28.

The controller 28 is able to emit a disengagement signal to the coupler 26, so as to switch the coupler 26 from the engaged state to the disengaged state, if a failure is detected affecting the supply circuit 10 of the electric motor and/or the electric motor 8 itself.

The controller 28 comprises a failure detector 44, a remote control module 46 and a close control module 48, which is secured to the coupler 26.

Advantageously, the controller 28 comprises an interface with the conductor of the railway vehicle allowing in-cabin display of a signal indicating the emission of the disengagement signal.

The detector 44 is able to send an alert signal to the remote control module 46 if a failure is detected.

The detector 44 comprises a measuring module 50 and a computing module 52.

The measuring module 50 is able to send the computing module 52 measured input and output values, relative to the operation of the traction system 2, in particular of the motor 8.

The measuring module 50 comprises sensors measuring input values and sensors measuring output values on the traction system 2.

For example, the input sensors measure an electric current, at the electric power supply circuit 10 and/or between two phases of the electric motor 8.

The output sensors also measure an electric current at the electric power supply circuit 10 and/or between two phases of the electric motor 8. Other output properties, such as a voltage, torque, etc., can also be measured.

Alternatively, the input and output sensors take a measurement of another physical property from among an electric voltage, a magnetic field, a temperature, an acceleration, a vibration, etc.

The computing module 52 is able to receive the input and output values measured by the measuring module 50 and to establish a diagnostic that may lead to the emission of the alert signal.

The computing module 52 is able to compute estimated output values from measured input values by using a dynamic model of the traction system 2. This dynamic model of the traction system, based on a plurality of differential equations connecting input properties to output properties, makes it possible to use measured input values of input properties to compute estimated output values of output properties. The estimated output values are next compared to the measured output values. Beyond a certain deviation between these values, a fault is declared.

The computing module 52 is able to compare the estimated output values with the measured output values of the traction system 2.

The computing module 52 is designed to emit the alert signal in case of a significant deviation between the estimated and measured output values.

Furthermore, the computing module 52 advantageously comprises a memory storing the measured input and output values and the estimated output values.

The remote control module 46 is connected to the computing module 52.

The remote control module 46 is able to receive the alert signal from the computing module 52, and to convert that alert signal into an actuating signal intended for the close control module 48.

The close control module 48 is secured to the coupler 26 and is consequently rotated.

The communications between the close control module 48 and the remote control module 46 are done using a wireless link, preferably by implementing a Wi-Fi protocol.

The close control module 48 is able to receive the actuating signal coming from the remote control module 46.

The close control module 48 is able to apply the received actuating signal as the disengagement signal for the coupler 26 so as to switch the latter from the engaged state to the disengaged state.

A method for protecting the electric motor 8 of a railway vehicle implemented using the protection system 24 of FIG. 1 will now be described.

Initially, the railway vehicle travels on a railroad track.

The measuring module 50 measures the input and output values at the electric power supply circuit 10 and/or between two phases of the electric motor 8.

The computing module 52 computes the estimated output values via the dynamic module as a function of the measured input values. The computing module 52 computes the deviation between the measured output values and the estimated output values. The computing module 52 makes its diagnosis.

When a significant deviation is measured, indicating a failure that could lead to a feared event, the detector 44 send an alert signal to the remote control module 46.

The remote control module 46 receives the alert signal and sends the corresponding actuating signal to the close control module 48.

The close control module 48 receives the actuating signal and applies it, as disengagement signal, to the coupler 26.

The disengagement signal triggers the firing of the pyrotechnic module 42, which results in breaking the shank 40.

The coupler 26 switching irreversibly from the engaged state to the disengaged state, the first and second flanges 30, 32 are uncoupled from one another.

The input shaft 16 is separated from the output shaft 14. The output shaft 14, associated with the rotor of the motor, decelerates and becomes immobilized, while the input shaft 16 continues to be driven by the moving railway vehicle wheels. The railway vehicle can therefore continue to move without the motor of the failed system working as a current generator.

Figure 2:
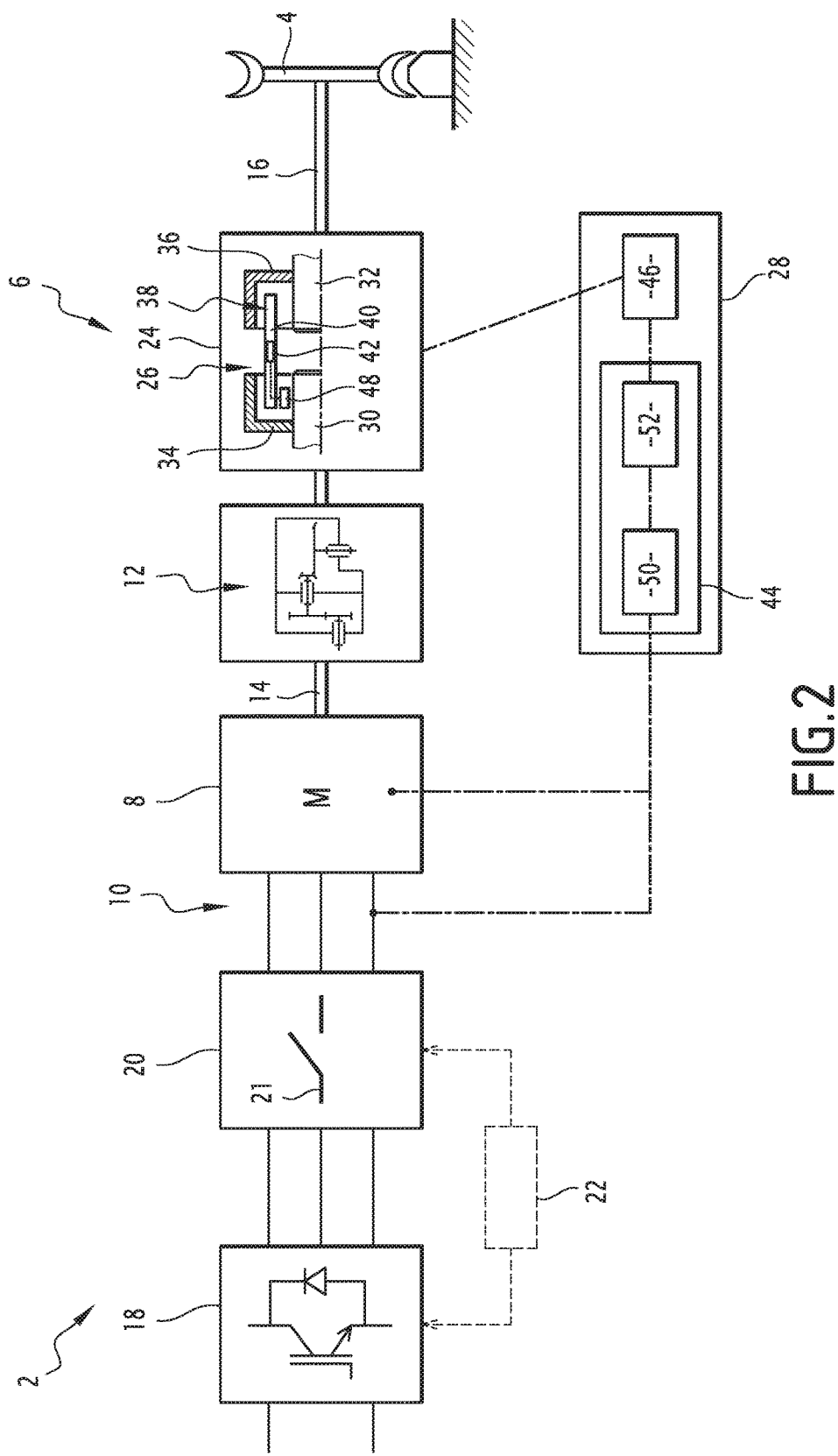
FIG. 2 is a diagram illustrating a railway vehicle traction system including a protection system according to a second embodiment.

FIG. 2 illustrates a second embodiment of the protection system 24 in which, all other things being equal, the coupler 26 is placed between an output shaft of the reduction gear 12 and an input shaft 16 of the axle.

Figure 3:
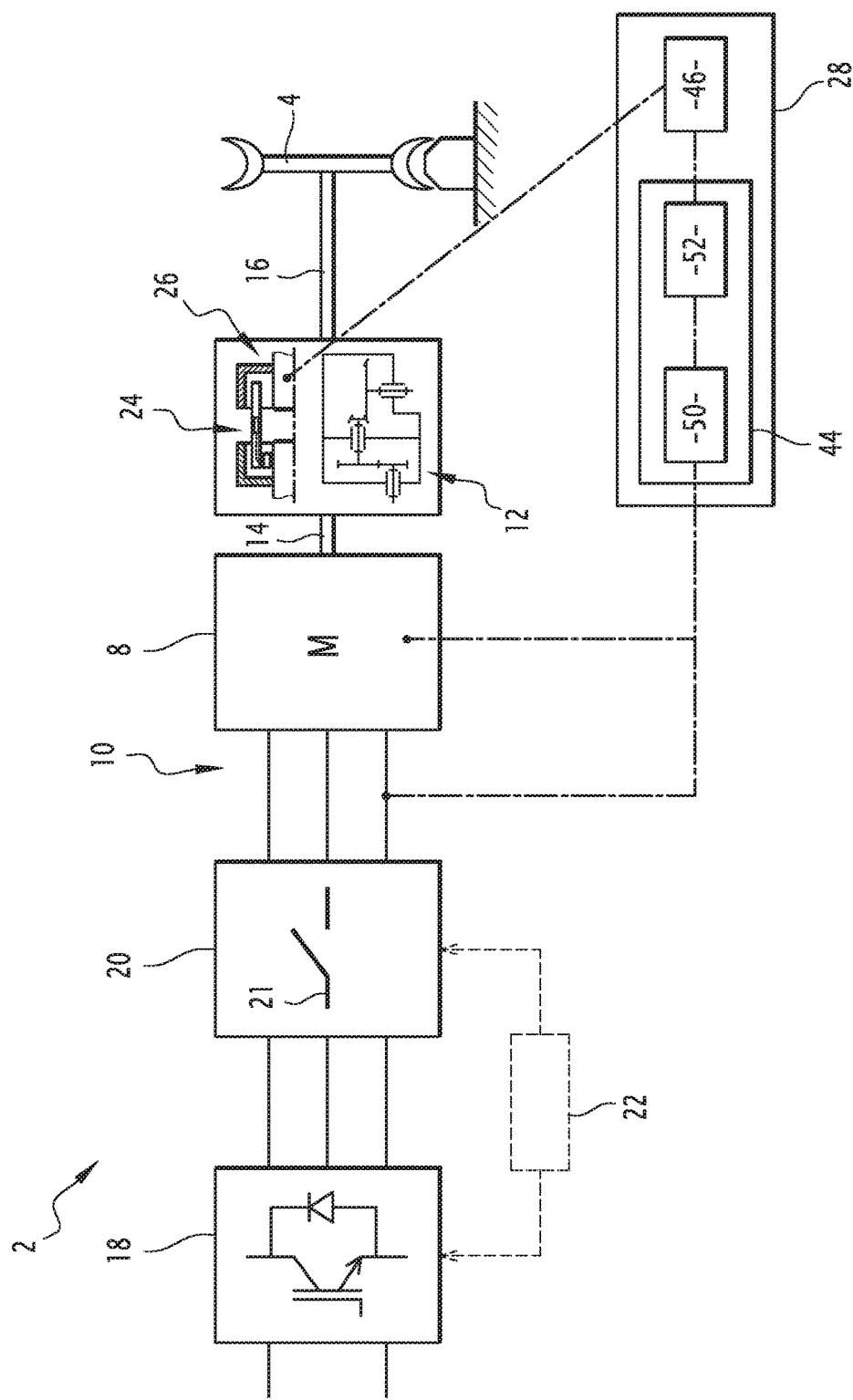
FIG. 3 is a diagram illustrating a railway vehicle traction system including a protection system according to a second embodiment.

FIG. 3 illustrates a third embodiment of the protection system 24 in which the coupler 26 is placed between two stages of a multi-level reduction gear 12.

Such a protection system 24 constitutes a safe emergency mechanical solution making it possible to separate the electric motor 8 from the axle 4, to mechanically insulate the motor 8 from any mechanical driving of the axle 4.

Such a protection system 24 constitutes a mechanical alternative in place of, or preferably in addition to, the purely electrical solution of the state of the art, making it possible to protect against a feared event.

Alternatively, the mechanical coupler 26 is able to switch from the engaged state to the disengaged state, and vice versa, from the disengaged state to the engaged state, upon receiving an appropriate engagement signal, generated by the controller 28.

In another alternative, independent of the previous ones, the detector 44 and the controller 22 share the detector that detects a failure of the traction system.

What is claimed is:

1. A protection system of a railway vehicle traction system, said traction system comprising:
    an electric motor and an electrical power supply circuit of the electric motor;
    a mechanical coupler between first and second components of a transmission line, the first component being connected to an output shaft of the electric motor and the second component being connected to an input shaft of an axle of the railway vehicle, the coupler being able to be in an engaged state, in which a torque can be transmitted between the first and second components, or in a disengaged state, in which no torque can be transmitted between the first and second components; and
    a controller for applying a disengagement signal to the mechanical coupler, so as to switch the mechanical coupler from the engaged state to the disengaged state if a failure is detected affecting the power circuit of the electric motor and/or the electric motor itself;
    wherein the coupler includes at least one securing element for securing the first and second components to one another and a pyrotechnic module able to break the securing element when a disengagement signal is applied by the controller, and
    wherein the first and second components are first and second flanges facing one another, and wherein the mechanical coupler is an explosive bolt securing the first and second flanges to one another.

2. The protection system according to claim 1, wherein the controller includes a remote control module, connected by a wireless link to a close control module, secured to the coupler, the close control module generating the disengagement signal applied to the coupler upon reception of an actuating signal emitted by the remote control module.

3. The protection system according to claim 2, wherein the controller includes a detector able, when a failure is detected, to send an alert signal to the remote control module so that the remote control module emits an actuating signal.

4. The protection system according to claim 3, wherein the detector is able to calculate estimated output values from measured input values and a dynamic model of the traction system, and to compare said estimated output values to measured output values on the traction system, the detection module being able to emit an alert signal in case of a significant deviation between the estimated and measured output values.

5. The protection system according to claim 1, wherein the coupler switches irreversibly from the engaged state to the disengaged state.

6. The protection system according to claim 1, wherein the mechanical coupler switches from the engaged state to the disengaged state upon reception of a disengagement signal, and vice versa, switches from the disengaged state to the engaged state upon reception of an engagement signal.

7. A transmission line for a railway vehicle, between a permanent magnet synchronous electric motor and an axle, wherein it includes a protection system according to claim 1.

8. The transmission line according to claim 7, wherein the mechanical coupler is installed between first and second components of the transmission line, the first and second components being first and second flanges provided on the facing ends of two half-shafts of the transmission line between the electric motor and the axle, or between a first stage and a second stage of a reduction gear of the transmission line.

9. A railway vehicle comprising a transmission line according to claim 7.

* * * * *